US011209017B2

United States Patent
Eskandar et al.

(10) Patent No.: US 11,209,017 B2
(45) Date of Patent: Dec. 28, 2021

(54) COMPACT COMPRESSOR INTAKE SYSTEM AND METHOD

(71) Applicant: General Electric Company, Schenectady, NY (US)

(72) Inventors: Alan Eskandar, Greenville, SC (US); Valery Ivanovich Ponyavin, Greenville, SC (US); Hua Zhang, Greer, SC (US); Christopher Conrad Frese, Greer, SC (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 16/112,061

(22) Filed: Aug. 24, 2018

(65) Prior Publication Data

US 2020/0063757 A1    Feb. 27, 2020

(51) Int. Cl.
*F04D 29/58* (2006.01)
*F04D 29/54* (2006.01)
*F04D 29/66* (2006.01)
*F04D 29/70* (2006.01)
*F02C 7/045* (2006.01)
*F04D 29/02* (2006.01)

(52) U.S. Cl.
CPC ............ *F04D 29/582* (2013.01); *F02C 7/045* (2013.01); *F04D 29/023* (2013.01); *F04D 29/545* (2013.01); *F04D 29/663* (2013.01); *F04D 29/701* (2013.01); *F05D 2220/32* (2013.01); *F05D 2260/20* (2013.01)

(58) Field of Classification Search
CPC .... F04D 29/701; F04D 29/663; F04D 29/545; F04D 29/023; F04D 29/582; F02C 7/045; F02C 7/057; F02C 7/08; F02C 7/047
See application file for complete search history.

(56) References Cited

U.S. PATENT DOCUMENTS

| 6,027,304 | A | * | 2/2000 | Arar ................. F02C 7/045 |
| | | | | 415/116 |
| 8,083,466 | B2 | | 12/2011 | Zhang |
| 8,926,265 | B2 | | 1/2015 | Ponyavin et al. |
| 8,932,004 | B2 | | 1/2015 | Ponyavin et al. |
| 9,359,951 | B2 | | 6/2016 | Merchant et al. |
| 9,771,865 | B2 | | 9/2017 | Merchant et al. |

(Continued)

FOREIGN PATENT DOCUMENTS

GB             667981 A * 3/1952 ............. F02C 7/047

*Primary Examiner* — Eldon T Brockman
*Assistant Examiner* — Andrew Thanh Bui
(74) *Attorney, Agent, or Firm* — Fletcher Yoder, P.C.

(57) ABSTRACT

A system includes an inlet duct disposed about an inlet axis, wherein the inlet duct is configured to direct an airflow along the inlet axis to a compressor inlet. The inlet includes an inlet heating system and a heating portion having a longitudinal axis that is substantially perpendicular to the inlet axis. The inlet heating system includes a first conduit substantially parallel to the longitudinal axis that is configured to distribute a heated fluid directly to the airflow via a first set of openings of a first end zone of the first conduit and a second set of openings of a second zone of the first conduit. The first end zone is configured to receive the heated fluid from a heating source, the second zone is coupled to the first end zone, and the second zone is configured to receive the heated fluid from the first end zone.

22 Claims, 5 Drawing Sheets

(56) References Cited

U.S. PATENT DOCUMENTS

2017/0074288 A1* 3/2017 Setty .................... F04D 29/545
2017/0292456 A1* 10/2017 Merchant ................. F01D 9/02
2018/0274445 A1* 9/2018 Sankarakumar ........ F02C 7/045

* cited by examiner

COMPACT COMPRESSOR INTAKE SYSTEM AND METHOD

BACKGROUND OF THE INVENTION

The subject matter disclosed herein relates to gas turbine systems, and, more particularly, to a compact compressor intake system for a gas turbine engine.

Gas turbine systems generally include a compressor, a combustor, and a turbine. The combustor combusts a mixture of compressed air and fuel to produce hot combustion gases directed to the turbine to produce work, such as to drive an electrical generator or other load. The compressor compresses an airflow from an air intake, and subsequently directs the compressed airflow to the combustor. The temperature of the airflow supplied to the air intake may affect the performance of the gas turbine system, particularly if the temperature is too low. An inlet heating system may be used to increase the temperature of the airflow. Heating the airflow within the air intake may reduce the airflow density and the mass flow to the compressor. However, noise from the compressor and the heating system can exceed regulated noise limits. Additionally, systems to control the temperature of the airflow supplied to the compressor and reduction of the noise within the intake may be costly or have large footprints.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an inlet duct disposed about an inlet axis, wherein the inlet duct is configured to direct an airflow along the inlet axis to a compressor inlet. The inlet includes a heating portion having a longitudinal axis that is substantially perpendicular to the inlet axis, and an inlet heating system. The inlet heating system includes a first conduit substantially parallel to the longitudinal axis, wherein the first conduit is configured to distribute a heated fluid directly to the airflow via a plurality of openings. The first conduit includes a first end zone with a first set of openings of the plurality of openings and a second zone with a second set of openings of the plurality of openings. The first end zone is configured to receive the heated fluid from a heating source, the second zone is coupled to the first end zone, and the second zone is configured to receive the heated fluid from the first end zone.

In a second embodiment, a system includes a side inlet air intake disposed about a horizontal axis, wherein the side inlet air intake is configured to direct an airflow along the horizontal axis to a compressor inlet. The side inlet air intake includes a heating portion with a longitudinal axis that is substantially perpendicular to the inlet axis, an inlet heating system, and one or more silencer modules upstream of the heating portion relative to the airflow through the side inlet air intake. The inlet heating system includes a plurality of conduits substantially parallel to the longitudinal axis, wherein the plurality of conduits is configured to distribute a heated fluid to the airflow via a plurality of openings. Each conduit of the plurality of conduits includes a first end zone with a first set of openings of the plurality of openings and a second zone with a second set of openings of the plurality of openings. The first end zone is configured to receive the heated fluid from a heating source, the second zone is coupled to the first end zone, and the second zone is configured to receive the heated fluid from the first end zone. The one or more silencer modules are disposed at least a first distance upstream of the plurality of conduits.

In a third embodiment, a method includes guiding an airflow through a side inlet air intake along an inlet axis into a heating portion, directing the airflow across a plurality of conduits extending along a longitudinal axis of the heating portion, introducing a heated fluid from the plurality of conduits to the airflow via a plurality of openings, and directing a mixture of the heated fluid and the airflow through an inlet plenum to a compressor inlet. The longitudinal axis is substantially perpendicular to the inlet axis. Each conduit of the plurality of conduits includes a first set of openings disposed along a first end zone with a first geometry and a second set of openings disposed along a second zone with a second geometry different than the first geometry. The side inlet air intake and the inlet plenum are disposed along the inlet axis.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine systems expand combustion gases through turbines to produce work that may drive one or more loads. Some gas turbine systems may be used in combined cycle and/or cogeneration systems that produce work from the heat of the combustion gases, such as through generating steam and directing the steam to a steam turbine. A gas turbine system may be selected to drive a design load of a known size, however, the actual load on the gas turbine system may change during operation of the gas turbine system.

The work produced by the gas turbine system is based at least in part on the quantity of an inlet flow (e.g., oxidant, air) supplied by the compressor to the combustor and to the turbine of the gas turbine system. Increasing the quantity of the inlet flow supplied to the combustor and to the turbine may increase the work produced, and decreasing the quantity of the inlet flow may decrease the work produced. As may be appreciated, increasing the temperature of a gas flow may decrease the density of the gas flow, and decreasing the temperature of the gas flow may increase the density of the gas flow. Accordingly, the quantity (e.g., mass) of the inlet flow supplied by the compressor may be controlled through controlling the temperature of the inlet flow without controlling the volumetric flow rate of the inlet flow. Additionally, or in the alternative, heating the inlet flow may reduce or eliminate ice formation within an air intake or compressor inlet of the gas turbine system.

The systems and methods described in detail below describe various embodiments that are configured to utilize a heated fluid to control the temperature of the inlet flow supplied to the compressor inlet. For example, the heated fluid may include a bleed flow from the compressor, a turbine extraction gas, an exhaust gas, a steam flow, or any combination thereof. In some embodiments, the heated fluid may be mixed with the inlet flow to protect the gas turbine compressor from icing, such as when operating at reduced inlet guide vane (IGV) angles. In some embodiments, the heated fluid may be used to reduce compressor pressure ratio at certain operating conditions where additional compressor operating margin is required.

Figure 1:
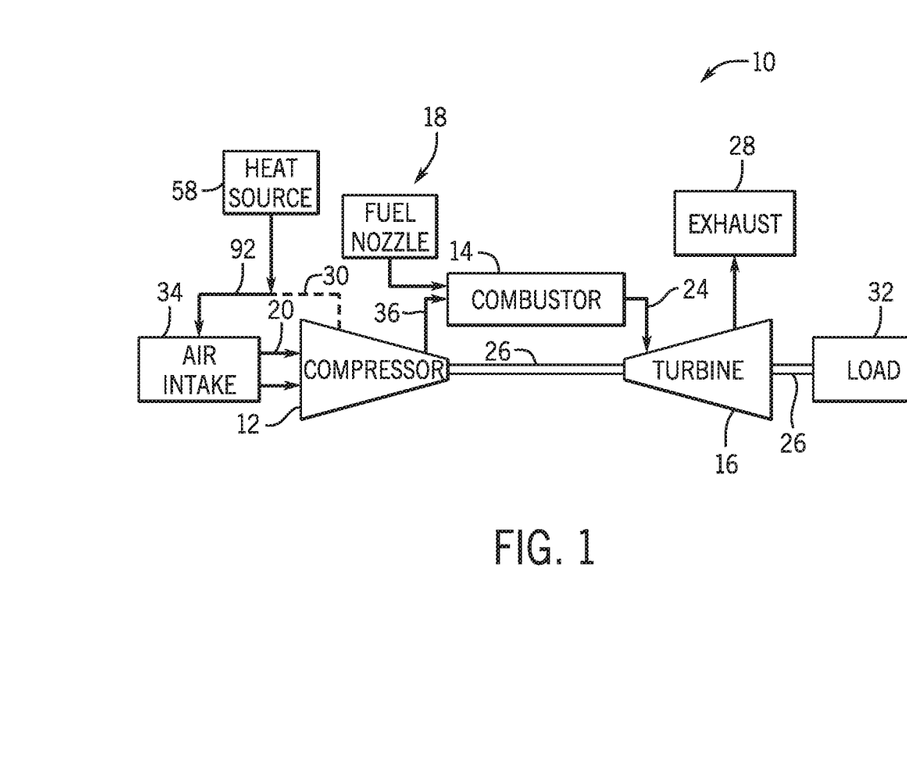
FIG. 1 is a schematic block diagram of an embodiment of a gas turbine system having an inlet heating system.

Turning now to the drawings, FIG. 1 illustrates a block diagram of an embodiment of a gas turbine system 10. The diagram includes a compressor 12, a turbine combustor 14, and a turbine 16. The turbine combustor 14 include one or more fuel nozzles 18, which route a liquid fuel and/or gas fuel (e.g., natural gas or syngas) into the turbine combustor 14. The turbine combustor 14 ignites and combusts an air-fuel mixture to create hot, pressurized combustion gases 24, which are subsequently directed into the turbine 16. It may be appreciated that while FIG. 1 illustrates one turbine combustor 14, some embodiments of the gas turbine system 10 may include multiple turbine combustors 14 that direct combustion gases 24 to the turbine 16. Turbine blades of the turbine 16 are coupled to one or more shafts 26, which may also be coupled to several other components throughout the turbine system 10, such as the compressor 12. As the combustion gases 24 flow against the turbine blades in the turbine 16, the turbine 16 is driven into rotation, which causes the shaft 26 to rotate. Eventually, the combustion gases 24 exit the turbine system 10 as an exhaust gas 28. The exhaust gas 28 may be recirculated to the turbine 16, recirculated to the compressor 12, routed to a heat recovery unit (e.g., heat recovery steam generator), filtered, vented to the ambient environment, or any combination thereof. The shaft 26 may be coupled to a load 32, which is powered via rotation of the shaft 26. For example, the load 32 may be any suitable device that may generate power via the rotational output of the turbine system 10, such as a power generation plant or an external mechanical load. In certain embodiments, the load 32 may include an electrical generator, a propeller of an airplane, and so forth.

In an embodiment of the gas turbine system 10, compressor blades are included as components of the compressor 12. The blades within the compressor 12 are coupled to the shaft 26, and will rotate as the shaft 26 is driven by the turbine 16, as described above. The rotation of the blades within the compressor 12 causes compression of an airflow 20 received by the compressor 12 from an air intake 34, thereby forming pressurized airflow 36. In some embodiments, the airflow 20 received through air intake 34 is mixed with a heated fluid 92, such as a compressor bleed flow 30, or another flow (e.g., exhaust gas, steam) from a heat source 58. The pressurized airflow 36 is then fed into the one or more fuel nozzles 18 of the turbine combustor 14. The fuel nozzles 18 mix the pressurized airflow 36 and fuel to produce a suitable air-fuel mixture for combustion (e.g., an air-fuel mixture that causes the fuel to more completely burn) so as not to waste fuel or produce excess emissions.

Figure 2:
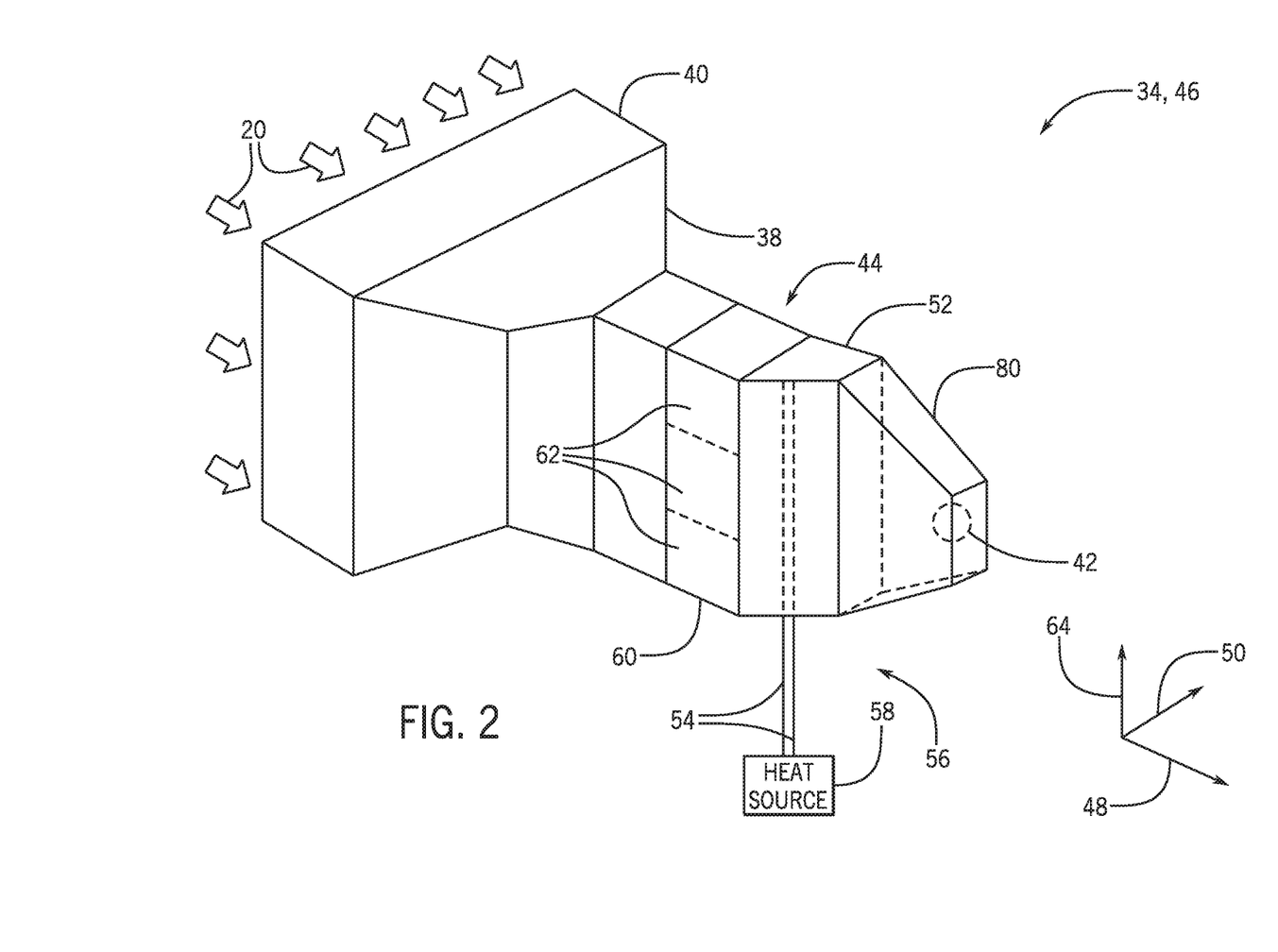
FIG. 2 is a perspective view of an embodiment of a side inlet air intake of the gas turbine system with a silencing portion that has a plurality of silencer modules.

As described in detail below, the air intake 34 may include various components to direct the airflow 20 to the compressor inlet. FIG. 2 illustrates an embodiment of an air intake 34 of the gas turbine system 10. The airflow 20 is drawn into a filter house 40 and supplied through an inlet duct 44 to the compressor 12 via a compressor inlet 42. One or more structures of the filter house 40 may filter the airflow 20. For example, louvers of the filter house 40 may reduce or eliminate larger particulates from the airflow 20. One or more filter media in the filter house 40 may reduce or eliminate smaller particulates from the airflow 20. In some embodiments, a cooling system (e.g., evaporative cooling system) of the filter house 40 may cool the airflow 20.

The filter house 40 supplies the airflow 20 to the inlet duct 44 of the air intake. FIG. 2 illustrates an embodiment of the air intake 34 that is a side inlet air intake. A side inlet air intake 46 is configured to receive the airflow 20 along a first axis 48 (e.g., inlet axis). That is, the filter house 40 and the inlet duct 44 of the side inlet air intake 46 are arranged along the inlet axis 48. The airflow 20 is delivered by the side inlet air intake 46 to the compressor inlet 42, which is arranged along a compressor axis 50. The compressor axis 50 is substantially perpendicular to the inlet axis 48, and the compressor axis 50 is substantially parallel to an axis of the shaft 26 of the gas turbine system 10. As utilized herein, the term substantially perpendicular includes angles that are within 1, 2, 3, 4, 5, 6, 7, 8, 9, or 10 degrees of perpendicular (e.g., 90 degrees), and the term substantially parallel includes angles that are within 1, 2, 3, 4, 5, 6, 7, 8, 9, or 10 degrees of parallel.

The inlet duct 44 of the side inlet air intake 46 may be narrower along the compressor axis 50 than the filter house 40. A transition piece 38 of the filter house 40 may narrow the side inlet air intake 46 from the width of the filter house 40 to the width of the inlet duct 44, as shown in FIG. 2. However, the airflow 20 through the side inlet air intake 46 primarily flows along the inlet axis 48 from the filter house 40 to the compressor inlet 42. In some embodiments, the side inlet air intake 46 extends along the inlet axis 48 such that the airflow 20 is not directed through sharp bends or elbows between the filter house 40 and an inlet plenum 80. It may be appreciated that the footprint of the gas turbine system 10 with a side inlet air intake 46 is different than the footprint of gas turbine systems with air intakes (e.g., up and forward intake) that receive the airflow substantially parallel with the compressor axis 50. That is, a side inlet air intake 46 may receive the airflow along the inlet axis 48 that is within approximately 5, 10, 15, or 20 degrees of a horizontal axis. In contrast, an up and forward intake may route an airflow substantially parallel to a vertical axis through a portion of the up and forward intake. In some embodiments, the side inlet air intake 46 has a smaller and/or more compact footprint than the footprint of conventional up and forward air intakes.

A heating portion 52 of the inlet duct 44 may add heat to the airflow 20 before the airflow 20 is directed through the compressor inlet 42. The heating portion 52 may have an inlet heating system 56 to heat the airflow 20 via the addition of a heated fluid to the airflow 20, by heating the airflow with heated elements (e.g., resistive heating elements, heat exchange tubes), or any combination thereof. The heated fluid may be added to the airflow 20 via one or more conduits 54 of the inlet heating system 56 extending through the heating portion 52 of the inlet duct 44. FIG. 2 illustrates the one or more conduits 54 extending into the heating portion 52 from a heat source 58. The heat source 58 for the heated fluid may include, but is not limited to, a bleed flow from the compressor, a turbine extraction gas, an exhaust gas, a steam flow, or any combination thereof.

The addition of the heated fluid to the airflow 20 may increase the noise of the airflow 20 through the inlet duct 44. For example, the heated fluid may increase turbulence of the airflow 20. Acoustic nozzles of the inlet heating system may be used to reduce the noise from the addition of the heated fluid. However, acoustic nozzles may increase the costs and complexity associated with the installation and/or manufacture of the inlet heating system. Accordingly, some embodiments of the inlet heating system 56 described herein may be without acoustic nozzles.

It may be appreciated that the compressor blades of the compressor 12 may increase the noise of the airflow 20 through the inlet duct 44. A silencer portion 60 of the inlet duct 44 may have one or more silencer modules 62 configured to attenuate or reduce the noise of the compressor 12 and the addition of the heated fluid from travelling along the airflow 20 upstream towards the filter house 40 and the ambient environment about the air intake 34.

In some embodiments, the inlet duct 44 may have two, three, or four or more silencer modules 62. The silencer modules 62 may be interchangeable with each other within the inlet duct 44. Moreover, the silencer modules 62 may be configured to be interchangeable with other silencer modules 62 for inlet ducts 44 of other air intakes. For example, a first gas turbine system may have a first air intake with two silencer modules 62, and a second gas turbine system that is larger than the first gas turbine system may have a second air intake with three or more silencer modules 62. However, the silencer modules 62 of the first gas turbine system may be interchangeable with the silencer modules 62 of the second gas turbine system. In some embodiments, the silencer modules 62 may be arranged along a vertical axis 64, as illustrated in FIG. 2. In some embodiments, the silencer modules 62 may be arranged along an axis that is tilted a silencer angle from the vertical axis toward the inlet axis 48 yet is substantially perpendicular to the compressor axis 50. The silencer angle may be less than 20, 15, 10, or 5 degrees. Each silencer module 62 may have a plurality of spaced panels that extend along the inlet axis 48, thereby reducing obstruction of the airflow 20 along the inlet axis 48 toward the compressor inlet 42. In some embodiments, the spaced panels of the silencer module 62 may extend along the inlet axis 48 and the compressor axis 50, along the inlet axis 48 and the vertical axis 64, or along the inlet axis 48 and the silencer angle described above.

Figure 3:
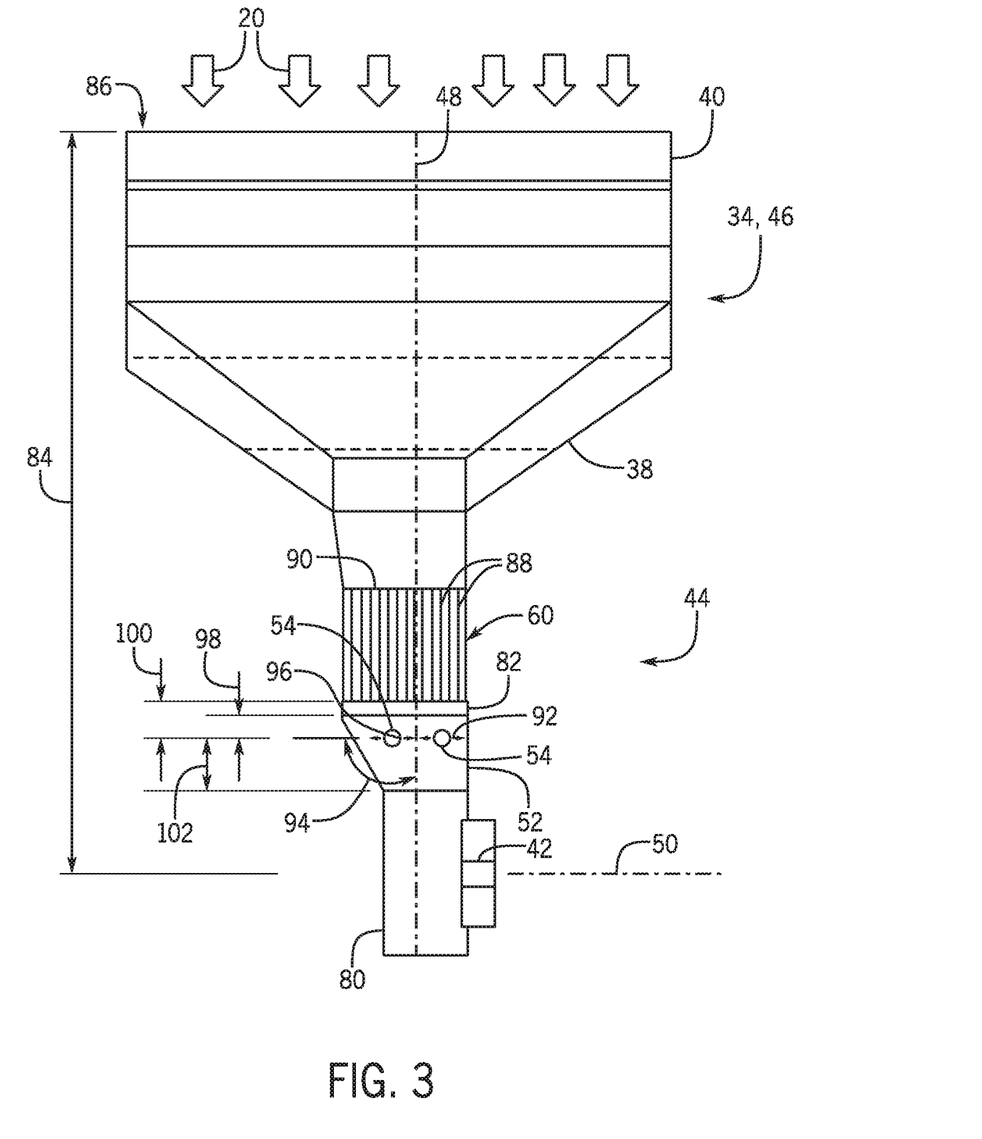
FIG. 3 is a top view of an embodiment of the side inlet air intake with a heating portion.

FIG. 3 illustrates a top view of an embodiment of the side inlet air intake 46. As discussed above, the filter house 40 and the inlet duct 44 are arranged along the inlet axis 48, which is substantially perpendicular to the compressor inlet 42 that directs the airflow 20 to the compressor 12. The airflow 20 is routed through the side inlet air intake 46 through the filter house 40, the silencer portion 60, the heating portion 52, an inlet plenum 80, and the compressor inlet 42. In some embodiments, an expansion joint 82 facilitates thermal expansion and contraction of the inlet duct 44. The expansion joint 82 may be arranged between the silencer portion 60 and the heating portion 52. The side inlet air intake 46 has an inlet length 84 from an upstream end 86 of the filter house 40 to the compressor inlet 42 of the inlet plenum 80. In some embodiments, the inlet length 84 may be approximately 12.2 to 22.9 meters, approximately 15.2 to 19.8 meters, or approximately 18.3 meters (approximately 40 to 75 feet, approximately 50 to 65 feet, or approximately 60 feet).

The expansion joint 82 may allow movement of the filter house 40 and silencer portion 60 along the inlet axis 48 relative to the heating portion 52 and the inlet plenum 80. For example, the expansion joint 82 may enable the heating portion 52 to move up to 2.54, 5.08, 7.62, 10.16, 12.7, or 15.24 cm (1, 2, 3, 4, 5, or 6) inches along the inlet axis 48 relative to the silencer portion 60. In some embodiments, the expansion joint 82 may enable some movement of the filter house 40 and the silencer portion 60 along the compressor axis 50 and/or the vertical axis 64. The expansion joint 82 may include one or more elastomeric materials to facilitate movement of downstream components (e.g., heating portion 52) relative to upstream components (e.g., silencer portion 60) of the inlet duct 44 while isolating the airflow 20 from the external environment around the inlet duct 44.

The silencer modules 62 of the silencer portion 60 may have a plurality of panels 88 that extend along the inlet axis 48 and are spaced apart from each other within a frame 90 to facilitate the airflow 20 to the compressor inlet 42. The silencer modules 62 may have components made of one or more of a variety of materials, including plastics, metals (e.g., aluminum, metallic matrix or foam, metallic wool), natural materials (e.g., rubber, wood), or composites, or any combination thereof. In some embodiments, one or more plastic materials may be utilized to form the silencer modules 62 of the silencer portion 60. Moreover, in some embodiments the silencer modules 62 may consist essentially of plastic materials without any metal components. For example, the materials of the silencer modules 62 may include, but are not limited to plastics, such as acrylonitrile butadiene styrene (ABS), polypropylene, polyethylene, PVC, CPVC, or suitable thermoplastic polymers. In some embodiments, a frame of the silencer modules 62 may be formed of plastic materials or composite materials (e.g., a reinforcement material distributed throughout a matrix material). The panels 88 of each silencer module 62 may include one or more sound absorption materials, such as mineral wools, basalt wool, fiberglass, melamine foam, polyurethane foam, or other suitable materials.

The one or more conduits 54 of the heating portion 52 supply the heated fluid 92 into the heating portion 52 via one or more openings 96 (e.g., holes). The heated fluid 92 mixes with the airflow 20 in the heating portion 52 and the inlet plenum 80 to heat the airflow 20. In some embodiments, the heated fluids 92 may be directed into the airflow 20 at a substantially perpendicular angle to the airflow 20 along the inlet axis 48. In some embodiments, the heated fluids 92 may be directed into the airflow 20 at an angle 94 relative to the inlet axis 48 that is away from the expansion joint 82, away from the silencer modules 62, or any combination thereof. Angling the heated fluids 92 away from the expansion joint 82 and/or away from the silencer modules 62 may reduce or eliminate temperature effects on the materials of the expansion joint 82 and silencer modules 62. The angle of the openings 96 may be controlled in addition to or in place of spacing of the conduits downstream of the expansion joint 82 and silencer modules 62. Exposure of some materials to high temperatures (e.g., temperatures greater than 175 degrees F.) may age and/or degrade the materials at greater rates than exposure of the materials to lower temperatures. For example, the glass-transition temperature of ABS plastic may be approximately 221 degrees F., and the openings 96 may be positioned and angled so that the ABS plastic of the silencer modules 62 is not exposed to temperatures near the glass-transition temperature. As discussed herein, the openings 96 of the conduits 54 may be considered to be angled away from the expansion joint 82 and/or the silencer portion 60 when the angle 94 is less than or equal to 90 degrees relative to the downstream direction along the inlet axis 48, as shown in FIG. 3.

In some embodiments, the openings 96 of the conduits 54 may have the same angle 94 with respect to the inlet axis 48 along the length of the conduits 54. In some embodiments, the angle 94 among the openings 96 may vary among the zones of the conduits 54, the side (e.g., external proximate a wall or internal proximate another conduit), or based on the position of the openings within the heating portion 52, or any combination thereof. For example, the openings 96 may be angled to direct the heated fluids 92 towards a wall (e.g., vertical wall) of the heating portion 52 of the inlet duct 44, such as at a substantially right angle to the wall. Furthermore, in some embodiments, one or more openings 96 may be angled along the axis (e.g., vertical axis 64) of the conduit 54, such that an axis of one or more openings 96 is less than perpendicular with the conduit 54. That is, the one or more openings 96 may be angled up towards a top wall of the heating portion 52, down towards a bottom wall of the heating portion 52, or any combination thereof.

In some embodiments, the expansion joint 82 of the inlet duct 44 is disposed at least a first distance 98 upstream of the conduits 54 of the heating portion 52. For example, the first distance 98 may be 7.62, 15.24, 22.86, or 30.48 cm (3, 6, 9, or 12 inches). In some embodiments, the silencer portion 60 of the inlet duct 44 is disposed at least a second distance 100 upstream of the conduits 54 of the heating portion 52. For example, the second distance may be 15.24, 30.48, 45.72, or 60.96 cm (6, 12, 18, or 24 inches). In some embodiments, the one or more conduits 54 may be uniformly spaced downstream from the silencer portion 60 of the inlet duct. The first distance 98 and the second distance 100 may reduce the exposure of the components of the expansion joint 82 and the silencer portion 60 to the higher temperatures of the heated fluids 92. In some embodiments, the inlet plenum 80 is disposed at least a third distance 102 downstream of the conduit 54 of the heating portion 52. The third distance 102 may facilitate a desired mixing of the heated fluids 92 with the airflow 20 prior to delivery to the compressor inlet 42 of the inlet plenum 80. The third distance 102 may be 30.48, 60.96, 91.44, or 121.92 cm (12, 24, 36, or 48 inches).

Figure 4:
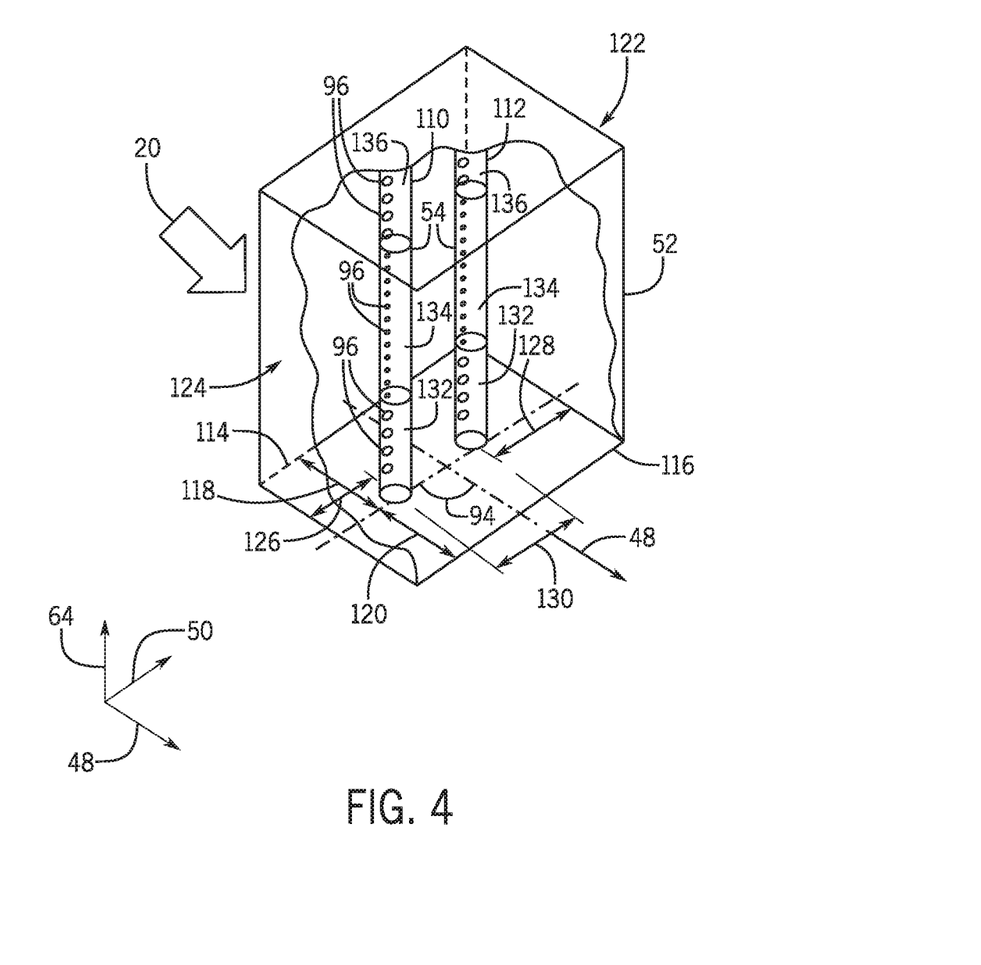
FIG. 4 is a perspective view of an embodiment of the heating portion of the side inlet air intake.

FIG. 4 illustrates a perspective view of an embodiment of the heating portion 52 of the inlet duct 44 with a first conduit 110 and a second conduit 112. The heating portion 52 receives the airflow 20 through an upstream end 114 of the heating portion 52 and conveys the airflow 20 through a downstream end 116 of the heating portion 52. In some embodiments, the upstream end 114 is coupled to the expansion joint 82 or the silencer portion 60. The downstream end 116 may be coupled to the expansion joint 82 or the inlet plenum 80. The one or more conduits 54 (e.g., first conduit 110, second conduit 112) that extend through the heating portion 52 may be substantially perpendicular to the direction of the airflow 20 through the inlet duct 44 along the inlet axis 48. The one or more conduits 54 may be substantially parallel to the vertical axis 64 or substantially parallel to the silencer angle discussed above. In some embodiments, the one or more conduits 54 extend along a longitudinal axis of the heating portion 52 that is substantially perpendicular to the inlet axis 48.

The first conduit 110 may be positioned a threshold distance 118 downstream of the upstream end 114 of the heating portion 52, and the first conduit 110 is positioned a mixing distance 120 upstream of the downstream end 116 of the heating portion 52. In some embodiments, the threshold distance 118 may be at least the first distance 98 or at least the second distance 100 discussed above. Additionally, or in the alternative, the mixing distance 120 may be at least the third distance 102 discussed above. Although the second conduit 112 is illustrated in FIG. 4 as being positioned relative to the upstream end 114 and the downstream end 116 like the first conduit 110, some embodiments of the heating portion 52 may have one or more conduits positioned at different distances downstream from the upstream end 114 of the heating portion 52. For example, the second conduit 112 may be positioned further downstream from the upstream end 114 than the first conduit 110 if a second wall 122 proximate the second conduit 112 converges towards the inlet axis 48 in the downstream direction.

The first conduit 110 may be disposed at a first offset 126 from a first wall 124 of the heating portion 52, and the second conduit 112 may be disposed at a second offset 128 from the second wall 122. The first offset 126 and the second offset 128 may be the same. In some embodiments, a spacing 130 between the first conduit 110 and the second conduit 112 is between 1 to 2 times the first offset 126. As discussed above, some embodiments of the heating portion 52 may have 1, 2, 3, 4, 5, or more conduits 54. In some embodiments the one or more conduits 54 may be uniformly spaced across the heating portion 52 and positioned at the same distance (e.g., threshold distance 118) from the upstream end 114 of the heating portion 52.

As discussed above, the conduits 54 are configured to distribute a heated fluid 92 through openings 96 into the airflow 20 to heat the airflow 20. In some embodiments, each conduit 54 has two or more columns of openings 96. For example, the first conduit 110 may have a first column of openings 96 directed towards the first wall 124, and the first conduit 110 may have a second column of openings 96 directed towards the second conduit 112 and/or the second wall 122. In some embodiments, one or more of the conduits 54 may have a column of openings 96 directed in a downstream direction that is away from the upstream components of the inlet duct 44 and not directed towards a wall or another conduit 54. As discussed above, each openings 96 may be configured to direct the heated fluid 92 into the airflow 20 at the angle 94 relative to the inlet axis 48 that is away from upstream components of the inlet duct 44, such as the expansion joint 82 and the silencer modules 62. In some embodiments, the angle 94 for each opening 96 may be 30, 45, 60, or 90 degrees. Moreover, in some embodiments, the angle 94 for each opening 96 is such that each opening 96 directs the heated fluid 92 towards a proximate wall (e.g., first wall 124, second wall 122) or another conduit 54. In some embodiments, the openings 96 of the conduits 54 may be holes without nozzles to control the distribution of the heated fluid 92 into the airflow or to attenuate noise of the distribution of the heated fluid 92. That is, the openings 96 of the conduits 54 may be without acoustic nozzles.

In some embodiments, one or more of conduits 54 have multiple zones, each zone having one or more openings 96 of the plurality of openings of the respective conduit 54. In some embodiments, each conduit 54 may have 2, 3, 4, 5, 6, 7, or more zones, and each zone may have a respective set of openings 96. Each set of openings 96 may have two or more columns of openings 96. In some embodiments, the openings 96 of the first conduit 110 are arranged along a first end zone 132, a second zone 134, and a third zone 136. The first end zone 132 may be configured to receive the heated fluid 92 from the heat source 58 and distribute the heated fluid 92 to a first set of openings 96 in the first end zone 132 and to the second zone 134. The second zone 134 is configured to distribute the received heated fluid 92 to a second set of openings 96 in the second zone 134 and to the third zone 136. The third zone 136 is configured to distribute the received heated fluid to a third set of openings 96 in the third zone 136.

In some embodiments, parameters of the set of openings 96 of a zone of the conduit 54 may be different than parameters of another set of openings 96 of another zone of the conduit 54. The parameters of a set of openings 96 of a zone may include, but are not limited to, the angle 94, the geometry (e.g., shape, size), the quantity of the openings in the zone, and the density of the openings in the respective zone. For example, the first set of openings 96 of the first end zone 132 may be larger than the second set of openings 96 of the second zone 134. In some embodiments, parameters of the third set of openings 96 of the third zone 136 may be equal to the parameters of the first set of openings 96 of the first end zone 132. In some embodiments, the spacing of the openings 96 along the conduit 54 do not change along the length of the conduit despite changes in the size of the openings 96. In some embodiments, a middle zone (e.g., second zone 134) of the conduit 54 may have between 1 to 3, 1.5 to 2.5, or approximately 2 times the openings 96 as the first end zone 132 of the conduit 54. The first end zone 132 and the third zone 136 may have between 20 to 100 openings 96 in each column, and the second zone 134 may have between 20 to 250 openings 96 in each column.

It is believed that for at least some side inlet air intakes, smaller openings 96 of the second zone 134 of the conduit 54 in the middle region of the heating portion 52 and larger openings 96 of the conduit 54 nearer the ends of the conduit 54 may improve the mixing of the heated fluid 92 with the airflow 20, thereby reducing a temperature variation of the airflow 20 in the inlet plenum 80. For example, the openings 96 of the first end zone 132 of the first conduit 110 may be between 5 to 20 percent larger than the openings 96 of the second zone 134 of the first conduit 110. In some embodiments, the openings 96 of the second zone 134 may have a diameter between approximately 0.762 to 1.016 cm, 0.889 to 0.991 cm, or 0.978 cm (approximately 0.30 to 0.40 inches, 0.35 to 0.39 inches, or 0.385 inches). The openings 96 of the first end zone 132 may have a diameter between approximately 0.889 to 1.143 cm, 0.965 to 1.067 cm, or 1.041 cm (approximately 0.35 to 0.45 inches, 0.38 to 0.42 inches, or 0.41 inches). In some embodiments, the openings 96 of the third zone 136 may have the same diameter as the openings 96 of the first end zone 132.

Figure 5:
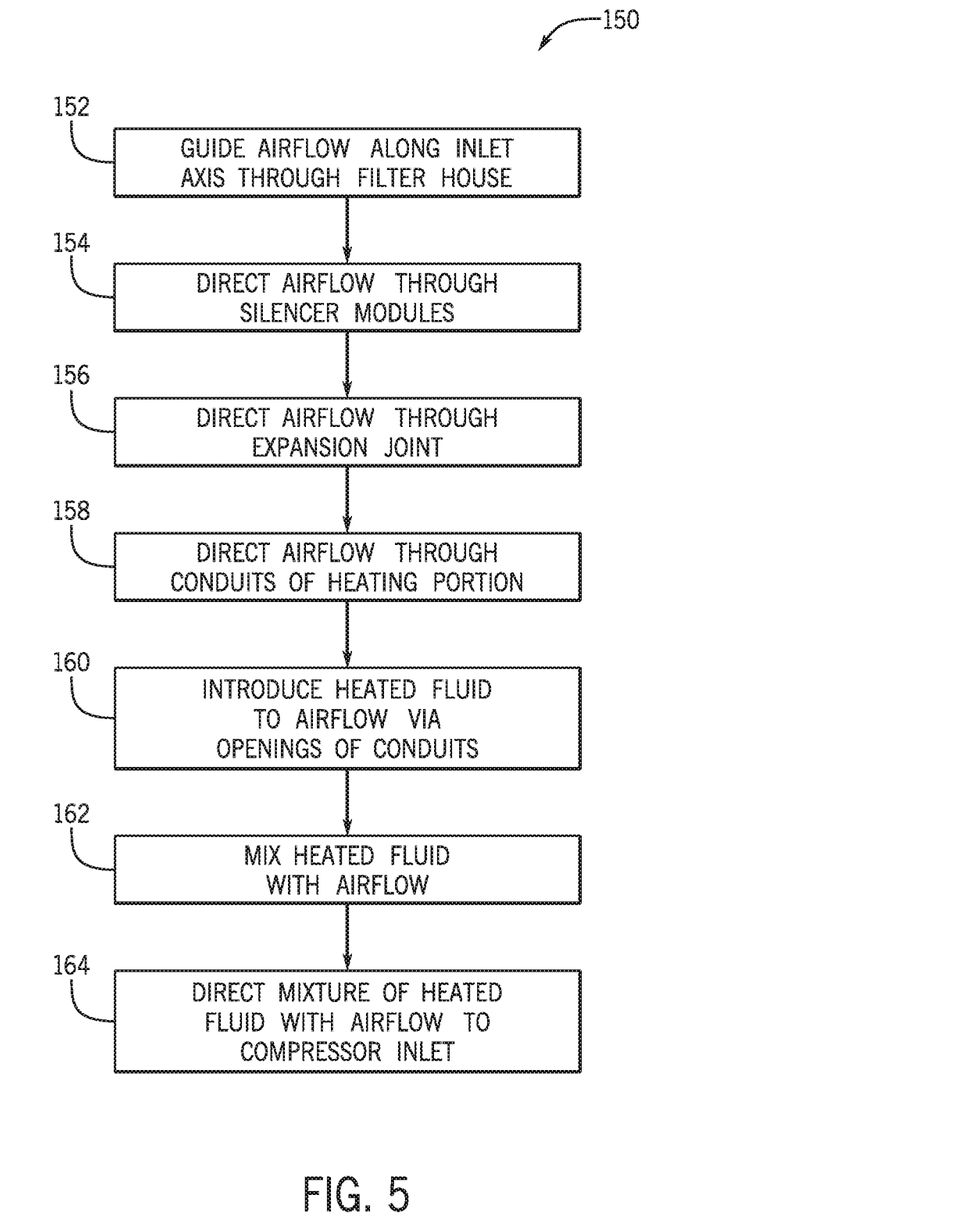
FIG. 5 is a flowchart of an embodiment of a method for providing a mixture of a heated fluid with an airflow to a compressor inlet.

The side inlet air intake described above may be configured to provide the airflow 20 to the compressor 12. FIG. 5 illustrates a flow chart of an embodiment of the method 150 of providing the airflow 20 to the compressor. The filter house of the side inlet air intake receives the airflow and guides (block 152) the airflow along an inlet axis. As discussed above, the side inlet air intake is disposed along the inlet axis, which is substantially perpendicular to the compressor axis. In some embodiments, the airflow is directed through (block 154) one or more silencer modules. The one or more silencer modules may be configured to attenuate noise from downstream of the silencer modules that may otherwise increase the noise volume in the ambient environment around the side inlet air intake. In some embodiments, the airflow is also directed through (block 156) an expansion joint that is configured to enable movement of portions of the side inlet air intake to move along at least the inlet axis due to thermal expansion or contraction of components of the side inlet air intake. The airflow is directed across (block 158) one or more conduits that extend through a heating portion of an inlet duct of the side inlet air intake. The one or more conduits may extend along a longitudinal axis (e.g., vertical axis) that is substantially perpendicular to the inlet axis. The one or more conduits introduce (block 160) a heated flow into the airflow via a plurality of openings. The plurality of openings may be directed away from upstream components of the side inlet air intake, such as the expansion joint and the silencer modules. The heating portion and an inlet plenum downstream of the heating portion mix (block 162) the heated flow with the airflow. The inlet plenum then directs (block 164) the mixture of the heated flow and the airflow to the compressor inlet.

Technical effects of the side inlet air intake include reduction in the costs and complexity associated with acoustic nozzles to supply heated flows to airflows provided to compressor inlets of gas turbine systems. The differential openings of zones of heating conduits may improve the mixing of the heated flow with the airflow. Additionally, the silencer modules described herein may enable rapid installation or replacement of one or more silencer modules. Moreover, the plastic materials of the silencer modules may reduce the manufacturing costs associated with the side inlet air intake.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
an inlet duct configured to be disposed upstream from a compressor, wherein the inlet duct is disposed about an inlet axis, wherein the inlet duct is configured to direct an airflow along the inlet axis to a compressor inlet of the compressor, wherein the inlet duct comprises:

a heating portion comprising a longitudinal axis that is substantially perpendicular to the inlet axis; and
an inlet heating system comprising a first conduit substantially parallel to the longitudinal axis, wherein the first conduit is configured to distribute a heated fluid directly to the airflow via a plurality of openings, wherein the first conduit comprises:
a first end zone comprising a first set of openings of the plurality of openings, wherein the first end zone is configured to receive the heated fluid from a heating source;
a second zone comprising a second set of openings of the plurality of openings, wherein the second zone is coupled to the first end zone and is configured to receive the heated fluid from the first end zone, wherein a second geometry of the second set of openings of the plurality of openings along the second zone is different than a first geometry of the first set of openings of the plurality of openings along the first end zone, wherein the first and second zones have one or more differences in the first and second geometries to control a distribution of the heated fluid, wherein the one or more differences in the first and second geometries comprise at least one of: angles, shapes, sizes, or densities of the first and second sets of openings; and
a third zone comprising a third set of openings of the plurality of openings, wherein the third zone is coupled to the second zone, wherein the second zone is disposed between the first and third zones, wherein the third zone comprises a third geometry of the third set of openings of the plurality of openings along the third zone, wherein the first conduit comprises at least one of:
the first and third geometries are the same;
the first and third geometries comprise larger sized openings than the second geometry; or
the first, second, and third geometries define alternating geometries in the respective first, second, and third zones.

2. The system of claim 1, wherein the inlet duct comprises an expansion joint upstream of the heating portion relative to the airflow through the inlet duct, wherein the expansion joint is disposed at least a first distance upstream of the first conduit to reduce an exposure of the expansion joint to higher temperatures of the heated fluid.

3. The system of claim 1, wherein the inlet duct comprises one or more silencer modules upstream of the heating portion relative to the airflow through the inlet duct, the one or more silencer modules are disposed at least a second distance upstream of the first conduit, the second distance comprises between 15 to 60 cm, the one or more silencer modules consist essentially of one or more plastic materials, the plurality of openings have an orientation away from the one or more silencer modules, and the second distance and the orientation are configured to reduce an exposure of the one or more silencer modules to higher temperatures of the heated fluid.

4. The system of claim 1, wherein the one or more differences comprise at least two of: angles, shapes, sizes, or densities of the first and second sets of openings.

5. The system of claim 1, wherein the inlet heating system comprises a second conduit substantially parallel to the longitudinal axis and spaced a third distance from the first conduit, wherein the second conduit is configured to distribute the heated fluid directly to the airflow via a second plurality of openings, wherein the second conduit comprises:
a fourth zone comprising a fourth set of openings of the second plurality of openings, wherein the first end zone is configured to receive a first portion of the heated fluid from the heating source, and the fourth zone is configured to receive a second portion of the heated fluid from the heating source; and
a fifth zone comprising a fifth set of openings of the second plurality of openings, wherein the fifth zone is coupled to the fourth zone and is configured to receive the second portion of the heated fluid from the fourth zone, wherein the fourth and fifth zones have one or more differences to control the distribution of the heated fluid, wherein the one or more differences comprise at least one of: angles, shapes, sizes, or densities of the fourth and fifth sets of openings.

6. The system of claim 1, wherein the first, second, and third geometries define the alternating geometries in the respective first, second, and third zones.

7. The system of claim 1, wherein the first and third geometries are the same.

8. The system of claim 1, wherein the system comprises:
a filter house coupled to an upstream end of the inlet duct;
an inlet plenum coupled to a downstream end of the inlet duct and configured to couple with the compressor inlet, wherein the filter house, the inlet duct, and the inlet plenum are disposed along the inlet axis, wherein the filter house, the inlet duct, and the inlet plenum are configured to direct the airflow along the inlet axis to the compressor inlet, wherein a compressor inlet axis of the compressor inlet is perpendicular to the inlet axis; and
a gas turbine engine having the compressor, a combustor, and a turbine, wherein the compressor is coupled to the inlet duct via the compressor inlet.

9. The system of claim 1, wherein the inlet duct comprises a side inlet air intake.

10. The system of claim 1, wherein the inlet heating system is configured to distribute the heated fluid to the airflow via the plurality of openings without acoustic nozzles.

11. The system of claim 1, wherein the heated fluid comprises a compressor bleed flow.

12. The system of claim 1, wherein the system comprises an inlet plenum coupled to a downstream end of the inlet duct and configured to couple with the compressor inlet, wherein the inlet plenum is disposed between 30 to 120 cm downstream from the first conduit.

13. A method comprising:
guiding an airflow through an air intake along an inlet axis into a heating portion, wherein the air intake is disposed upstream from a compressor;
directing the airflow across a plurality of conduits extending along a longitudinal axis of the heating portion, wherein the longitudinal axis is substantially perpendicular to the inlet axis;
introducing a heated fluid from the plurality of conduits to the airflow via a plurality of openings, wherein each conduit of the plurality of conduits comprises:
a first set of openings disposed along a first end zone;
a second set of openings disposed along a second zone, wherein a second geometry of the second set of openings along the second zone is different than a first geometry of the first set of openings along the first end zone, wherein the first and second zones have one or more differences in the first and second geometries to control a distribution of the heated fluid, wherein the one or more differences in the first and second geometries comprise at least one of: angles, shapes, sizes, or densities of the first and second sets of openings;

a third set of openings disposed along a third zone, wherein the second zone is disposed between the first and third zones, wherein the third zone comprises a third geometry of the third set of openings along the third zone, wherein each conduit of the plurality of conduits comprises at least one of:
the first and third geometries are the same;
the first and third geometries comprise larger sized openings than the second geometry; or
the first, second, and third geometries define alternating geometries in the respective first, second, and third zones; and directing a mixture of the heated fluid and the airflow through an inlet plenum to a compressor inlet of the compressor, wherein the air intake and the inlet plenum are disposed along the inlet axis.

14. The method of claim 13, comprising:
directing the airflow through one or more silencer modules upstream of the plurality of conduits, wherein the one or more silencer modules consist essentially of one or more plastic materials, and the one or more silencer modules are disposed at least a first distance upstream of the plurality of conduits to reduce an exposure of the one or more silencer modules to higher temperatures of the heated fluid, and
directing the airflow through an expansion joint upstream of the plurality of conduits, wherein the expansion joint is disposed at least a second distance upstream of the plurality of conduits.

15. The system of claim 5, wherein the inlet heating system has a set of conduits with only the first and second conduits disposed in the inlet duct, the first set of openings comprises a first opening size, the second set of openings comprise a second opening size, and the first and second opening sizes are different from one another.

16. The system of claim 1, wherein the first and third geometries comprise larger sized openings than the second geometry.

17. The system of claim 1, wherein the first end zone is disposed adjacent a first wall of the inlet duct, the third zone is a third end zone disposed adjacent a second wall of the inlet duct, and the second zone is disposed at an intermediate location between the first and second walls of the inlet duct.

18. The system of claim 1, wherein the inlet duct comprises a silencer module upstream of the heating portion relative to the airflow through the inlet duct, wherein the first conduit is sized with a larger width relative to a width of the silencer module.

19. The method of claim 13, wherein the first and third geometries are the same.

20. The method of claim 13, wherein the first and third geometries comprise larger sized openings than the second geometry.

21. The method of claim 13, wherein the first, second, and third geometries define the alternating geometries in the respective first, second, and third zones.

22. A system, comprising:
an inlet duct configured to be disposed upstream from a compressor, wherein the inlet duct is disposed about an inlet axis, wherein the inlet duct is configured to direct an airflow along the inlet axis to a compressor inlet of the compressor, wherein the inlet duct comprises:
a heating portion comprising a longitudinal axis that is substantially perpendicular to the inlet axis; and
an inlet heating system comprising a first conduit substantially parallel to the longitudinal axis, wherein the first conduit is configured to distribute a heated fluid directly to the airflow via a plurality of openings, wherein the first conduit comprises:
a first end zone comprising a first set of openings of the plurality of openings, wherein the first end zone is configured to receive the heated fluid from a heating source; and
a second zone comprising a second set of openings of the plurality of openings, wherein the second zone is coupled to the first end zone and is configured to receive the heated fluid from the first end zone, wherein the first and second zones have one or more differences to control a distribution of the heated fluid, wherein the one or more differences comprise at least two of: angles, shapes, sizes, or densities of the first and second sets of openings.

* * * * *